United States Patent
Ogawa (10) Patent No.: US 9,533,460 B2
(45) Date of Patent: Jan. 3, 2017

(54) TIRE AND METHOD FOR FABRICATING BEAD MEMBER

(75) Inventor: Yuichiro Ogawa, Fuchu (JP)

(73) Assignee: BRIDGESTONE CORPORATION, Tokyo (JP)

(*) Notice: Subject to any disclaimer, the term of this patent is extended or adjusted under 35 U.S.C. 154(b) by 364 days.

(21) Appl. No.: 13/467,405

(22) Filed: May 9, 2012

(65) Prior Publication Data
US 2013/0000809 A1    Jan. 3, 2013

(30) Foreign Application Priority Data
Jun. 28, 2011    (JP) ................... 2011-142862

(51) Int. Cl.
     *B29D 30/48*      (2006.01)
     *B60C 15/06*      (2006.01)
     *B60C 15/04*      (2006.01)

(52) U.S. Cl.
CPC ............... *B29D 30/48* (2013.01); *B60C 15/04* (2013.01); *B60C 15/0607* (2013.04); *B29D 2030/481* (2013.01); *B29D 2030/482* (2013.01); *Y10T 152/10819* (2015.01)

(58) Field of Classification Search
CPC ............. B60C 15/0009; B60C 15/0607; B60C 2001/0058; B60C 2015/061; B60C 2015/0642; B60C 2015/0678; B60C 2015/0682; B60C 2015/0621; B29D 30/48; B29D 2030/481; B29D 2030/482; B29D 2030/486
USPC ........ 156/117, 135, 136, 422; 152/541, 547, 152/552, 554
See application file for complete search history.

(56) References Cited

U.S. PATENT DOCUMENTS

| | | | | |
|---|---|---|---|---|
| 5,725,702 A | * | 3/1998 | Nakamura et al. | ............ 152/541 |
| 6,000,452 A | * | 12/1999 | Sumiya | ................... B60C 15/06 |
| | | | | 152/454 |
| 6,352,090 B1 | * | 3/2002 | Rayman | ................... B60C 9/22 |
| | | | | 152/167 |
| 2001/0050134 A1 | * | 12/2001 | Iizuka | ........................ 156/128.1 |

(Continued)

FOREIGN PATENT DOCUMENTS

| | | |
|---|---|---|
| FR | 2953458 A1 | 6/2011 |
| JP | 06-234310 A * | 8/1994 |

(Continued)

OTHER PUBLICATIONS

Dec. 1, 2015 Search Report issued in European Patent Application No. 12804049.0.

*Primary Examiner* — Geoffrey L Knable
(74) *Attorney, Agent, or Firm* — Oliff PLC (57) ABSTRACT

An object is to improve the durability of the stiffener having a hard rubber member and a soft rubber member formed on the radially inner side and the radially outer side by laminating rubber strips. A tire includes bead cores, stiffeners provided on the outer circumferences of the bead cores, and a carcass ply. Ends of the carcass ply are disposed on the stiffeners. Each stiffener includes an inner rubber portion on the radially inner side, an outer rubber portion on the radially outer side, and a cover tape. The inner rubber portion is formed by laminating a first rubber strip. The outer rubber portion is formed by laminating a second rubber strip. The second rubber strip is composed of rubber having a lower rigidity than the inner rubber portion. The cover tape covers a part of the stiffener that comes into contact with the end of the carcass ply.

4 Claims, 6 Drawing Sheets

(56) References Cited

U.S. PATENT DOCUMENTS

| | | | |
|---|---|---|---|
| 2003/0102088 A1* | 6/2003 | Iiduka | 156/394.1 |
| 2008/0053595 A1* | 3/2008 | Hrycyk et al. | 156/136 |
| 2012/0145302 A1* | 6/2012 | Feltes | B60C 15/06 152/541 |
| 2013/0192737 A1 | 8/2013 | Bondu | |

FOREIGN PATENT DOCUMENTS

| | | | |
|---|---|---|---|
| JP | 08-175129 A | * | 7/1996 |
| JP | H08-324214 A | | 12/1996 |
| JP | A-11-011118 | | 1/1999 |
| JP | 2001-096641 A | | 4/2001 |
| JP | 2002-137310 A | | 5/2002 |
| JP | A-2007-076233 | | 3/2007 |

* cited by examiner

TIRE AND METHOD FOR FABRICATING BEAD MEMBER

BACKGROUND OF THE INVENTION

1. Field of the Invention

The present invention relates to a tire having a stiffener formed of a rubber strip, and a method for fabricating a bead member having a bead core and the stiffener.

2. Description of the Related Art

A tire includes a bead member provided at a bead portion, and a carcass ply. The bead member includes a bead core and a stiffener formed on the outer circumference of the bead core. The carcass ply is folded back around the bead core. The tire also includes a sidewall portion that is deflected and deformed during driving. Due to this deflection and deformation, an end of the carcass ply may be repeatedly subjected to large compression strain. If the end of the carcass ply is positioned on the stiffener, deformation and strain act on the stiffener. In order to counter this problem, Japanese Unexamined Patent Application Publication No. 11-11118 discloses a tire having a stiffener composed of two kinds of rubber to reduce deformation and strain.

In a conventional tire, a stiffener is composed of an inner rubber portion located on the radially inner side and an outer rubber portion located on the radially outer side. The inner rubber portion is a hard stiffener composed of rubber having a high rigidity. The outer rubber portion is a soft stiffener composed of rubber having a low rigidity. Because the hard inner rubber portion reduces deflection and deformation occurring at the sidewall portion, strain occurring at the end of the carcass ply is reduced. At the same time, the soft outer rubber portion absorbs and reduces strain that is being transmitted. Because the strain is reduced, the conventional tire can prevent separation occurring near the end of the carcass ply, even after a long-time drive.

Typically, the stiffener of a bead member is formed by wrapping wide extruded rubber around the bead core. The extruded rubber is formed in a predetermined shape by an unvulcanized rubber extruder. Extruded rubber having a high rigidity is wound around the bead core in one layer, forming the inner rubber portion of the stiffener. Extruded rubber having a low rigidity is wound around the inner rubber portion in one layer, forming the outer rubber portion of the stiffener. By using the extruded rubber, the time and effort required for forming the stiffener can be reduced, improving the production efficiency.

However, when the extruded rubber is used, because the ends thereof are joined, a joined portion is formed at one position in the circumferential direction. Furthermore, another joined portion is formed at the boundary between the inner and outer rubber portions. As a result, the surface of the stiffener becomes irregular. Thus, stiffeners made of extruded rubber needs to be improved, from the standpoint of further increasing the roundness and the balance in the circumferential direction. Furthermore, hardware (for example, the sleeve of the extruder) needs to be changed every time the shape of the stiffener is changed, which is time and cost consuming. To overcome this problem, Japanese Unexamined Patent Application Publication No. 2007-76233 discloses a method for forming a stiffener by laminating rubber strips (ribbon-shaped rubber members).

In this method, first, an unvulcanized rubber strip is laminated, forming a first rubber member. Then, a bead core having a hexagonal cross section is pressed against the first rubber member, integrating the bead core and the first rubber member. Next, a rubber strip is laminated on the bead core and the first rubber member, forming a second rubber member. The first and second rubber members are composed of the same rubber and together constitute the inner rubber portion of the stiffener. Then, a rubber strip is laminated thereon, forming a third rubber member. The third rubber member is composed of rubber softer than the first and second rubber members and constitutes the outer rubber portion of the stiffener. By forming the first to third rubber members in sequence, the stiffener is formed on the bead core.

By forming the stiffener of the rubber strips, the irregularity on the stiffener is reduced, and the roundness and the balance in the circumferential direction of the stiffener are improved. Furthermore, stiffeners of various shapes can be formed without changing hardware. However, stiffeners made of rubber strips are more susceptible to the above-described deformation and strain occurring at the end of the carcass ply than stiffeners made of extruded rubber. Therefore, it is difficult to improve the durability of the stiffeners made of rubber strips at the end of the carcass ply, and a further improvement in durability is required.

SUMMARY OF THE INVENTION

The present invention has been made in view of the above-described problems, and an object thereof is to improve the durability of the stiffener having a hard rubber member and a soft rubber member formed on the radially inner side and the radially outer side by laminating rubber strips.

An aspect of the present invention is a tire including a pair of bead cores; stiffeners provided on the outer circumferences of the bead cores; and a carcass ply disposed between the pair of bead cores, ends of the carcass ply being disposed on the stiffeners. The stiffeners each have an inner rubber portion on the radially inner side formed by laminating a first rubber strip, an outer rubber portion on the radially outer side formed by laminating a second rubber strip composed of rubber having a lower rigidity than the inner rubber portion, and a cover tape covering a part of the stiffener in contact with the end of the carcass ply.

Another aspect of the present invention is a method for fabricating a bead member, the method including a step of forming a stiffener on the outer circumference of a bead core, the stiffener being formed of an inner rubber portion located on the radially inner side and an outer rubber portion located on the radially outer side, an end of a carcass ply being disposed on the stiffener. The step of forming a stiffener includes a step of forming the inner rubber portion by laminating a first rubber strip, a step of forming the outer rubber portion by laminating a second rubber strip having a lower rigidity than the inner rubber portion, and a step of arranging a cover tape on a part of the stiffener in contact with the end of the carcass ply.

The present invention can improve the durability of the stiffener having a hard rubber member and a soft rubber member formed on the radially inner side and the radially outer side by laminating rubber strips.

DESCRIPTION OF THE PREFERRED EMBODIMENTS

Referring to the drawings, an embodiment of a tire and a method for fabricating a bead member of the present invention will be described.

A tire of this embodiment is a vehicle tire used for various vehicles including trucks and buses. A description will be given below, taking a pneumatic tire for a truck or a bus as an example.

This tire is composed of tire components and has a known structure. Furthermore, this tire has a pair of bead portions, a pair of sidewall portions, and a tread portion. The sidewall portions are located on the radially outer side of the bead portions. The tread portion is provided between the tips of the pair of sidewall portions. The tire has a belt and a tread rubber member at the tread portion.

Figure 1:
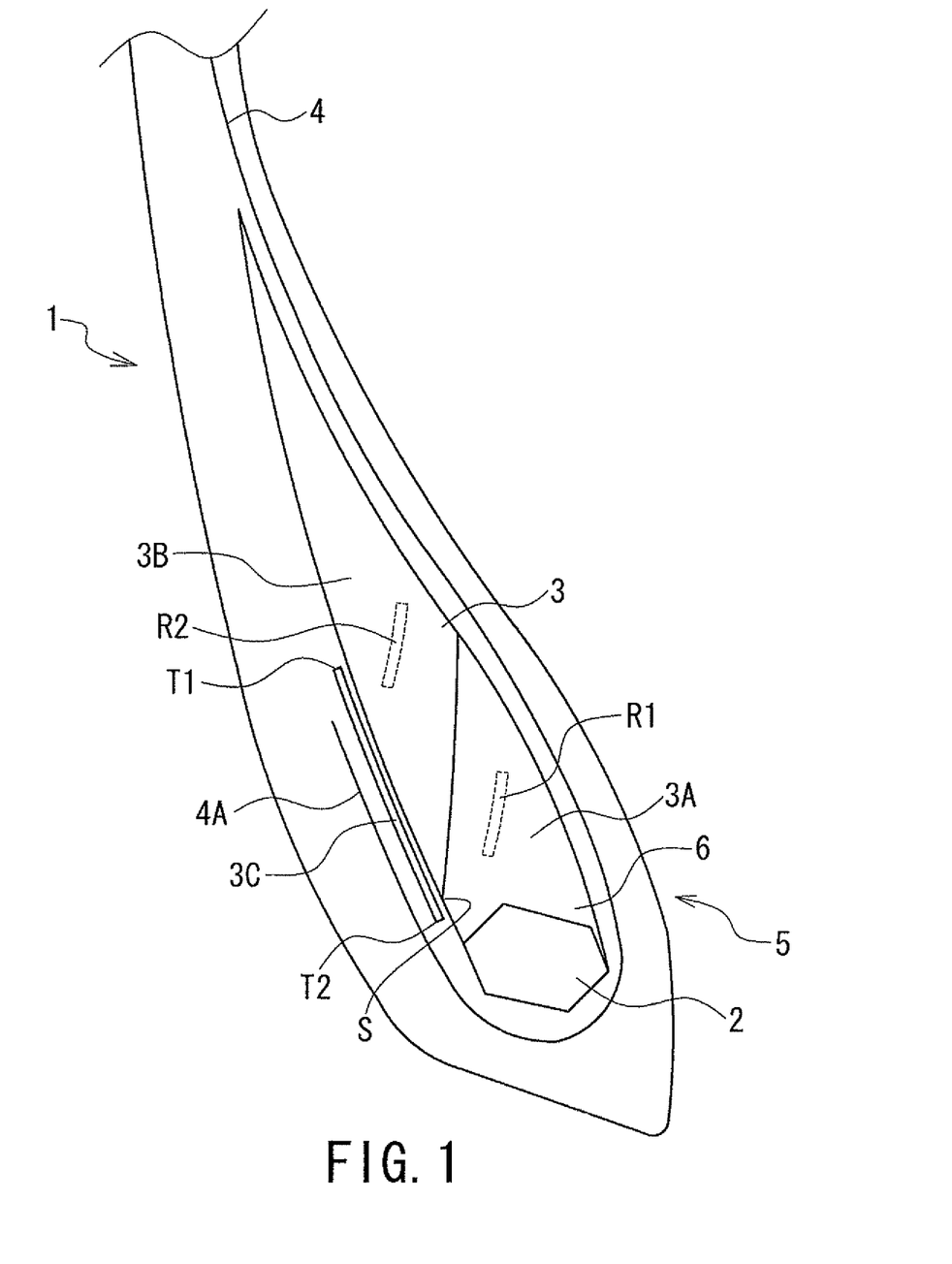
FIG. 1 is a cross-sectional view of a bead portion of a tire according to this embodiment.

FIG. 1 is a cross-sectional view of a bead portion of a tire according to this embodiment. FIG. 1 shows the structure of one bead portion and the periphery thereof in cross section taken in the width direction of the tire (left-right direction in FIG. 1). The other bead portion is located to the right of the bead portion shown in FIG. 1.

A tire 1 includes a pair of annular bead cores 2, stiffeners 3, and a carcass ply 4. The tire 1 also includes bead members 6 disposed at bead portions 5 (FIG. 1 shows only one of each pair).

A bead core 2 is provided at the bead portion 5 and is disposed along the circumferential direction of the tire. The bead core 2 has a polygonal cross section having five or more sides (a hexagonal cross section in FIG. 1). The stiffener 3 is a rubber member provided on the outer circumference of the bead core 2. The stiffener 3 has an annular shape and is disposed on the radially outer side of the bead core 2. The stiffener 3 has such a cross sectional shape that it is narrowed from the bead core 2 toward the radially outer side. The bead member 6 is a tire component composed of the bead core 2 and the stiffener 3.

The carcass ply 4 is composed of a plurality of cords (not shown) and a covering rubber, and is disposed between the pair of bead cores 2 such that it has a toroidal shape. Furthermore, the carcass ply 4 is disposed on the surface of the bead member 6 at the bead portion 5, passes on the inner side of the bead member 6 in the width direction of the tire, and is folded back around the bead core 2. The carcass ply 4 extends from the inner side toward the outer side in the radial direction of the tire, on the outer side of the bead member 6 in the width direction of the tire. An end (a folded back portion in this embodiment) 4A of the carcass ply 4 is disposed on the surface of the stiffener 3.

The stiffener 3 includes an inner rubber portion 3A located on the radially inner side, an outer rubber portion 3B located on the radially outer side, and a cover tape 3C. The inner rubber portion 3A is formed by laminating a first rubber strip R1. The outer rubber portion 3B is formed by laminating a second rubber strip R2. The second rubber strip R2 is composed of rubber having a lower rigidity than the inner rubber portion 3A.

In FIG. 1, one cross section of the first rubber strip R1 and one cross section of the second rubber strip R2 are virtually illustrated by dashed lines. The inner rubber portion 3A and the outer rubber portion 3B are formed by laminating the first rubber strip R1 and the second rubber strip R2 in multiple layers (not shown). More specifically, the first rubber strip R1 and the second rubber strip R2 are strip-shaped (or ribbon-shaped) rubber members composed of unvulcanized rubber, which are vulcanized when the unvulcanized tire is vulcanized.

The inner rubber portion 3A is formed on the radially outer side (on the outer circumference) of the bead core 2, has a triangular cross section, and is disposed between the bead core 2 and the outer rubber portion 3B. The inner rubber portion 3A is composed of a hard rubber having a higher rigidity than the second rubber strip R2 and the outer rubber portion 3B. That is, the inner rubber portion 3A is a hard rubber portion (a hard stiffener) and constitutes the radially inner side portion of the stiffener 3. The outer rubber portion 3B is formed on the inner rubber portion 3A, has a narrow triangular cross section, and is disposed so as to extend toward the radially outer side from the inner rubber portion 3A. The outer rubber portion 3B is a soft rubber portion (a soft stiffener) composed of a soft rubber having a lower rigidity than the first rubber strip R1 and the inner rubber portion 3A and constitutes the radially outer side portion of the stiffener 3.

The cover tape 3C is a reinforcement member that covers the inner rubber portion 3A and the outer rubber portion 3B of the stiffener 3 to reinforce a portion of the stiffener 3 adjacent to the end 4A of the carcass ply 4 and is disposed on the outer surface of the stiffener 3 in the width direction of the tire. The cover tape 3C is a tape-shaped rubber member (rubber tape) composed of unvulcanized rubber and is vulcanized when the unvulcanized tire is vulcanized. The cover tape 3C has a larger width than the rubber strips R1 and R2 so that it can cover certain parts of the inner rubber portion 3A and outer rubber portion 3B of the stiffener 3. Herein, the cover tape 3C is composed of rubber having a lower rigidity than the inner rubber portion 3A and having a higher rigidity than the outer rubber portion 3B. The cover tape 3C is formed to have a predetermined width and thickness and is circumferentially arranged on the stiffener 3. Thus, the annular cover tape 3C is formed on a part of the stiffener 3, covering a part of the surface of the stiffener 3 so as to fill the step between the rubber strips R1 and R2.

The cover tape 3C covers a portion of the surface of the stiffener 3 in contact with the end 4A of the carcass ply 4. More specifically, the cover tape 3C is arranged at the peripheral portion of the stiffener 3, including a portion in contact with the end A, for example, a portion in contact with the end 4A and its peripheral portion or a portion in contact with the end 4A, and covers a part of or the entirety of the surface of the stiffener 3 in contact with the end 4A. Furthermore, a radially outer end T1 of the cover tape 3C is positioned radially outer than the end 4A of the carcass ply 4, i.e., on the radially outer side of the tip of the carcass ply 4 (the radially outer end), to reinforce the end 4A of the carcass ply 4. Furthermore, a radially inner end T2 of the cover tape 3C is positioned radially inner than a radially outer end (outer circumferential position) S of the inner rubber portion 3A in the portion in contact with the end 4A of the carcass ply 4.

Next, a system for fabricating the bead member 6 (hereinbelow, simply, a "fabricating system") will be described. The fabricating system fabricates the unvulcanized bead member 6 used to produce an unvulcanized tire.

Figure 2:
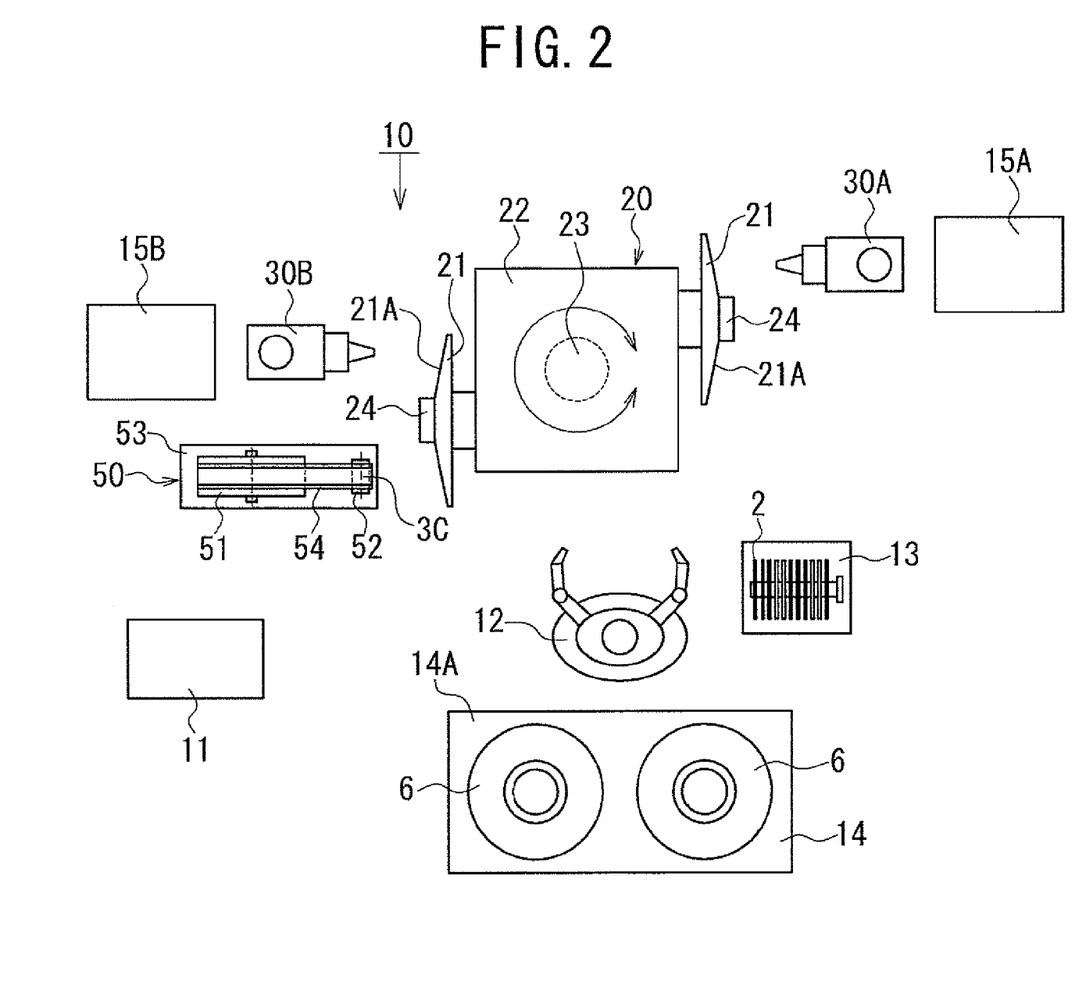
FIG. 2 is a plan view of a system for fabricating a bead member according to this embodiment.

FIG. 2 is a plan view of a fabricating system 10 according to this embodiment. FIG. 2 schematically shows, in outline, the configuration of the fabricating system 10.

As shown in FIG. 2, the fabricating system 10 includes a control device 11, a forming apparatus 20 for forming the stiffener 3, a robot 12, a storage portion 13 for storing the bead cores 2, and a storage portion 14 for storing the bead member 6. The fabricating system 10 also includes a first extruder 30A and a second extruder 30B, and an attaching device 50 for attaching the cover tape 3C. The control device 11 controls the entire fabricating system 10 and executes the process of forming the bead member 6.

The forming apparatus 20 includes two disc-like laminating discs 21 and a driving device 22. The laminating discs 21 each have a laminating surface 21A having the shape of an annular flat surface. The rubber strips R1 and R2 (not shown in FIG. 2) are laminated on the laminating surfaces 21A of the laminating discs 21. The bead member 6 are formed on the laminating discs 21. The two laminating discs 21 are attached to the driving device 22, at positions away from each other by 180 degrees. The driving device 22 rotates the laminating discs 21 at a predetermined speed via rotation devices (not shown). Furthermore, the driving device 22 is pivoted about a pivot axis 23 by a pivot device (not shown). The laminating discs 21 pivot together with the driving device 22. The driving device 22 includes a temperature adjusting device (not shown) for adjusting the temperature of the laminating discs 21, and a separating mechanism (not shown) for separating the bead member 6 from the laminating discs 21.

Figure 3A:
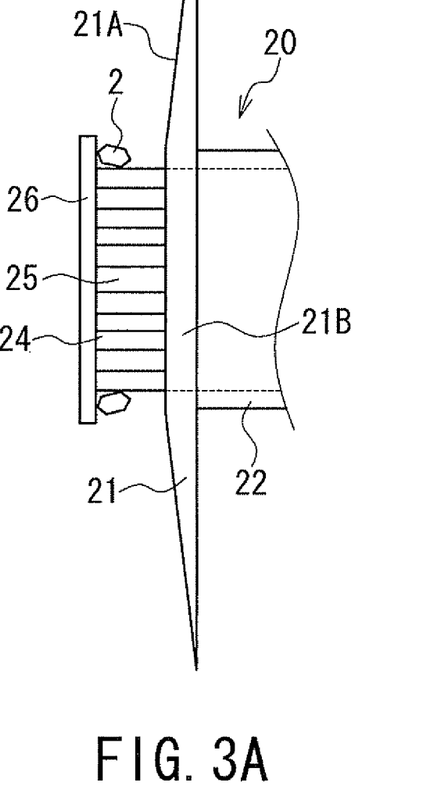
FIGS. 3A and 3B are enlarged side views of a laminating disc.
Figure 3B:
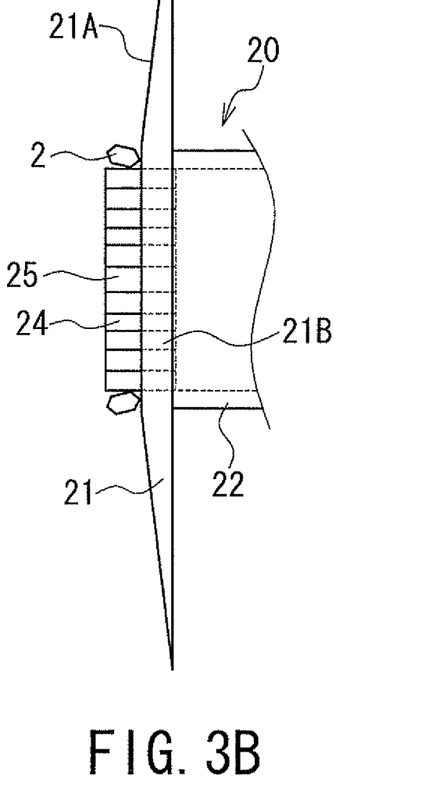

FIGS. 3A and 3B are enlarged side views of the laminating disc 21. The cross section of the bead core 2 is also shown in FIGS. 3A and 3B.

The forming apparatus 20 includes holding devices 24 for holding the bead cores 2. Each holding device 24 is mounted at the center of the laminating disc 21 and includes a plurality of cylindrically arranged movable members 25, a stopper 26, and a moving mechanism (not shown) for moving the movable members 25. The plurality of movable members 25 are moved radially by the moving mechanism. More specifically, the plurality of movable members 25 are moved radially outwardly to hold the bead core 2 and are moved radially inwardly to release the bead core 2.

The bead core 2 is held by the holding device 24 from the inside, at the ends of the plurality of movable members 25. The stopper 26 (see FIG. 3A) is attached to the plurality of movable members 25 so as to be in contact with the bead core 2. The bead core 2 is supported by the stopper 26 from the side. The laminating disc 21 has an insertion portion 21B into which the holding device 24 is inserted. The holding device 24 is moved relative to the laminating disc 21 by a shifting mechanism (not shown) and is inserted into the insertion portion 21B (see FIG. 3B). The bead core 2 is pressed against the laminating disc 21 by the holding device 24. When the bead member 6 is transferred from the holding device 24 and the laminating disc 21 to another place, the stopper 26 is removed from the movable members 25, and the movable members 25 are moved radially inwardly.

The bead cores 2 are stored in the storage portion 13 (see FIG. 2). The fabricated bead member 6 are stored on pallets 14A of the storage portion 14. The storage portion 14 is a wagon having a plurality of pallets 14A stacked vertically. The storage portion 13 and the storage portion 14 are located near the robot 12. The robot 12 is an industrial robot having a plurality of arms. The robot 12 picks up a bead core 2 from the storage portion 13 and places it on the holding device 24. The robot 12 also removes the bead member 6 from the laminating disc 21 and places it on the pallet 14A. At this time, the driving device 22 is pivoted to position the laminating disc 21 at the working position (in front) of the robot 12. The thus-fabricated bead member 6 are stored on the storage portion 14.

The first extruder 30A and the second extruder 30B are installed at the sides of the forming apparatus 20. In other words, the forming apparatus 20 is situated between the first extruder 30A and the second extruder 30B. The first extruder 30A and the second extruder 30B extrude the rubber strip R1 and the rubber strip R2, respectively, toward the forming apparatus 20. At this time, the driving device 22 is pivoted to position the laminating discs 21 in front of the first extruder 30A and the second extruder 30B. The first extruder 30A and the second extruder 30B extrude different kinds of unvulcanized rubber, which are fed from a rubber feeder 15A and a rubber feeder 15B, respectively, into rubber members having predetermined cross sections. The first extruder 30A extrudes the first rubber strip R1, and the second extruder 30B extrudes the second rubber strip R2. The rubber strips R1 and R2 are laminated on the laminating discs 21.

Figure 4:
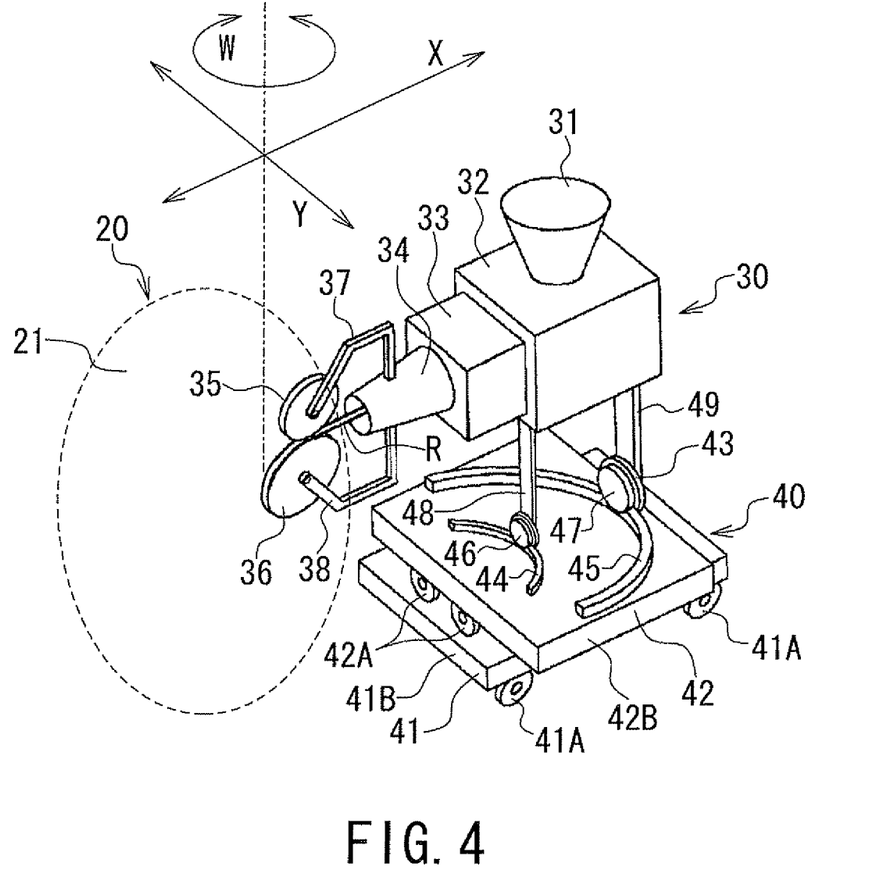
FIG. 4 is a perspective view of a rubber strip extruder.
Figure 5A:
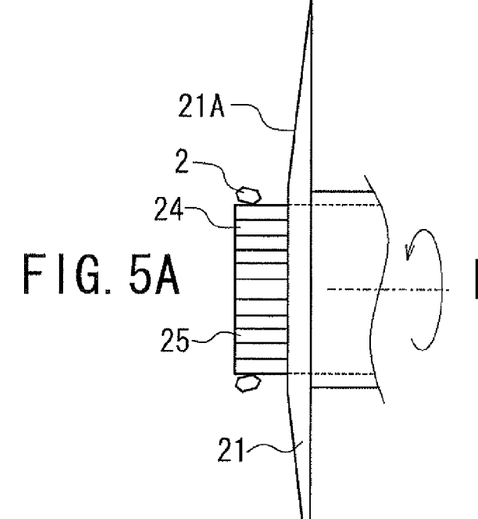
FIGS. 5A to 5D show the process of fabricating the bead member.
Figure 5B:
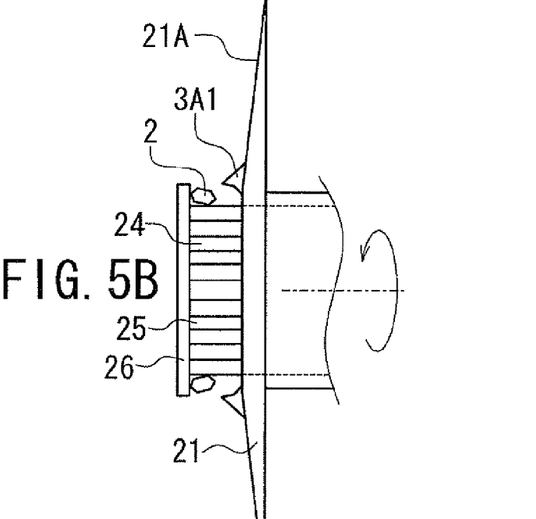
Figure 5C:
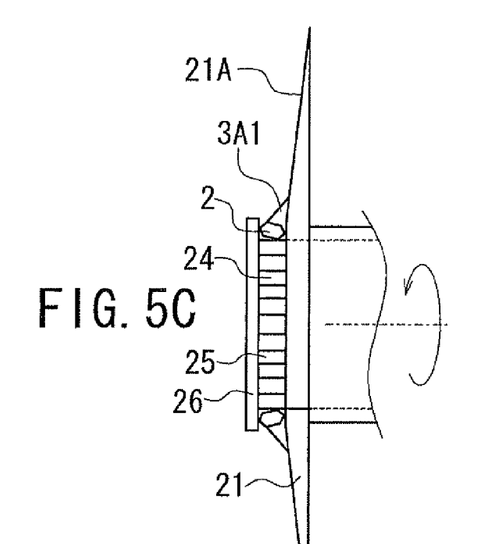
Figure 5D:
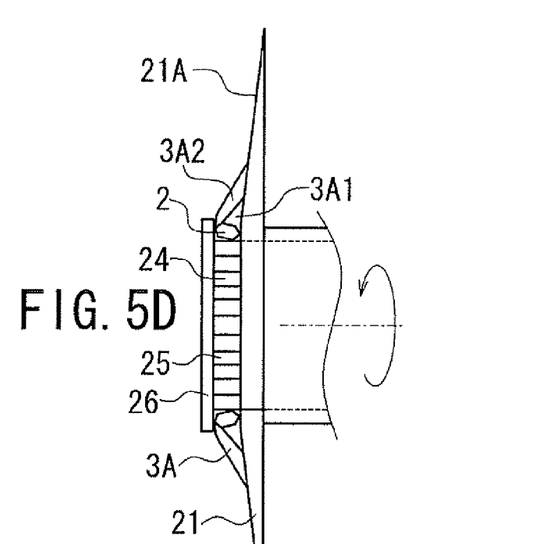

FIG. 4 is a perspective view of the extruder 30 (30A, 30B) for extruding the rubber strip R (R1, R2).

As shown in FIG. 4, the extruder 30 includes a hopper 31, a main body 32, a gear pump 33, a sleeve 34, a pair of laminating rollers 35 and 36, and moving means 40. Unvulcanized rubber is fed from the hopper 31 into the main body 32 and is kneaded by a rotating screw (not shown) in the main body 32. The main body 32 feeds the unvulcanized rubber into the gear pump 33 by a screw, and the gear pump 33 continuously discharges the unvulcanized rubber while maintaining the amount of discharged unvulcanized rubber constant. The unvulcanized rubber is extruded from an opening in the sleeve 34 attached to a discharge port of the gear pump 33 and is formed to have a predetermined cross-sectional shape. Thus, the rubber strip R composed of unvulcanized rubber is formed. The extruder 30 continuously extrudes the rubber strip R from the sleeve 34.

The pair of laminating rollers 35 and 36, which are supported by support members 37 and 38 fixed to the sleeve 34, are disposed in front of the sleeve 34 and are rotated in opposite directions by a driving device (not shown). The rubber strip R passes between the pair of laminating rollers 35 and 36 and is laminated on the laminating disc 21 by the laminating roller 36. At this time, the laminating disc 21 is rotated at a speed corresponding to the laminating speed of the rubber strip R. The laminating roller 36 presses the rubber strip R against the laminating disc 21, thereby attaching the rubber strip R to the laminating disc 21 or a member on the laminating disc 21. The rubber strip R is arranged circumferentially on the laminating disc 21 as the laminating disc 21 is rotated. The laminating roller 36 laminates the rubber strip R in layers.

The extruder 30 is disposed above the moving means 40 and is moved by the moving means 40. The moving means 40 includes first to third moving mechanisms 41 to 43 and driving devices (not shown) for moving the moving mechanisms 41 to 43. The first and second moving mechanisms 41 and 42 have moving tables 41B and 42B that are moved by wheels 41A and 42A. The first moving mechanism 41 moves the extruder 30 in the direction of the axis of the laminating disc 21 (direction X). The second moving mechanism 42, which moves on the first moving mechanism 41, moves the extruder 30 horizontally (direction Y), which is the direction perpendicular to the direction X.

The third moving mechanism 43 includes two rails 44 and 45, two wheels 46 and 47, and two connecting members 48 and 49. The rails 44 and 45 have arch shapes and are fixed to the top of the second moving mechanism 42. The connecting members 48 and 49 connect the wheels 46 and 47 to the main body 32. The third moving mechanism 43 moves the wheels 46 and 47 on the rails 44 and 45, causing the extruder 30 to pivot. The extruder 30 pivots about a contact point between the laminating roller 36 and the laminating disc 21 in the direction indicated by an arrow W.

The moving means 40 moves the extruder 30 to an arbitrary position on a horizontal plane (XY plane) by the first and second moving mechanisms 41 and 42 and, at the same time, causes the extruder 30 to pivot by the third moving mechanism 43. Thus, the extruder 30 changes the position and angle of the rubber strip R to be laminated. The rubber strip R is laminated on the rotating laminating disc 21 in a predetermined pattern by the extruder 30. The extruder 30 continuously laminates the rubber strip R and forms an annular rubber member on the laminating disc 21. The annular rubber member, formed by laminating the rubber strip R, has a predetermined cross-sectional shape. While the rubber strip R is laminated, a press roller (stitcher) (not shown) is pressed against the rubber strip R.

The attaching device 50 (see FIG. 2) is positioned beside the second extruder 30B and includes a roll 51, a rotatable attaching roller 52, and a moving stage 53. The cover tape 3C, after being formed of unvulcanized rubber, is placed on a tape-like liner 54 composed of resin (for example, polyethylene). The cover tape 3C and the liner 54 are taken up on the roll 51, and the cover tape 3C and the liner 54 are fed from the roll 51 to the attaching roller 52. The moving stage 53 moves the entire attaching device 50. Thus, the attaching roller 52 is pressed against the rubber (stiffener 3) on the laminating disc 21.

The attaching roller 52 presses the cover tape 3C against a predetermined portion of the stiffener 3 to attach the cover tape 3C thereto. The cover tape 3C is circumferentially arranged on the stiffener 3 as the laminating disc 21 is rotated. The liner 54 is separated from the cover tape 3C and is recovered by the attaching device 50. Once the cover tape 3C is arranged on the stiffener 3 in one circle, the rotation of the laminating disc 21 is stopped, and cutting means (not shown) cuts the cover tape 3C. Thus, the cover tape 3C is circularly arranged on the stiffener 3.

Next, a process of fabricating the tire bead member 6 (see FIG. 1) will be described. The fabricating system 10 (see FIG. 2) fabricates the bead member 6 by forming the stiffener 3 having the inner rubber portion 3A and the outer rubber portion 3B on the outer circumference of the bead core 2. At this time, first, the robot 12 places the bead core 2 on the holding device 24 of the laminating disc 21. While the bead core 2 is held by the holding device 24, the driving device 22 is pivoted to position the laminating disc 21 in front of the first extruder 30A.

Figure 6A:
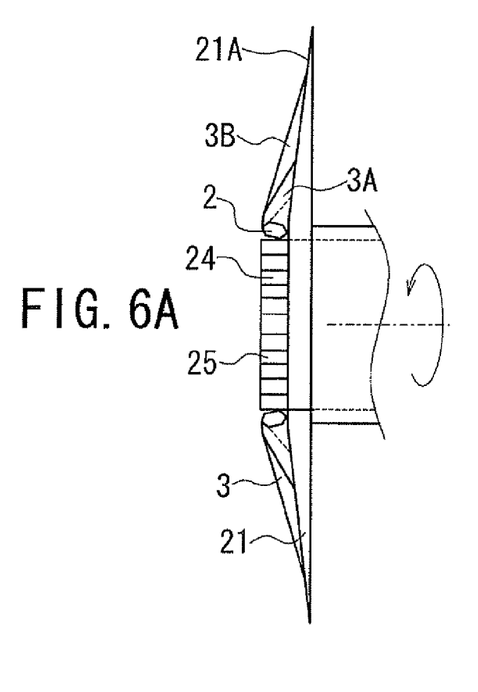
FIGS. 6A to 6C show the process of fabricating the bead member.
Figure 6B:
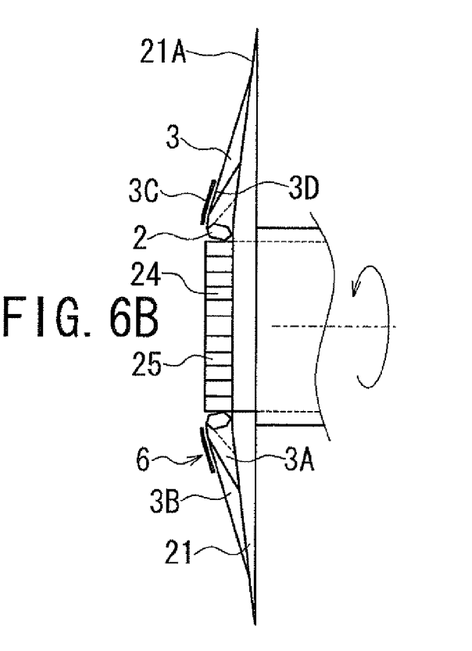
Figure 6C:
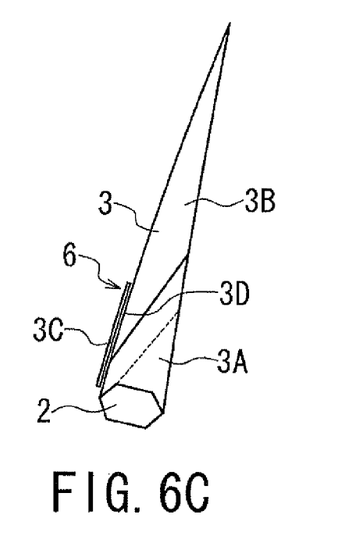

FIGS. 5A to 5D and 6A to 6C show the process of fabricating the bead member 6. FIGS. 5A to 5D and 6A to 6C are side views of the laminating disc 21. The respective parts of the bead member 6 are shown in cross section. FIG. 6C shows one cross section of the bead member 6 in an enlarged manner.

The bead core 2 (see FIG. 5A) is arranged at a position away from the laminating disc 21. In this state, the laminating disc 21 is rotated, and the first extruder 30A begins to laminate the first rubber strip R1 on the laminating disc 21. By laminating the first rubber strip R1 on the laminating disc 21, the inner rubber portion 3A, which is positioned on the radially inner side in the stiffener 3, is formed. When forming the inner rubber portion 3A, first, the first rubber strip R1 is laminated to form a part 3A1 of the inner rubber portion 3A (see FIG. 5B) on the laminating disc 21. The part 3A1 is a radially inner part of the inner rubber portion 3A and comes into contact with the outer circumference of the bead core 2.

Next, the bead core 2 (see FIG. 5C) is pressed against the laminating disc 21 and the part 3A1 of the inner rubber portion 3A by the holding device 24, and thus, the bead core 2 is attached to the inner circumference of the inner rubber portion 3A and is positioned on the part 3A1 of the inner rubber portion 3A. After the bead core 2 is attached, the first extruder 30A laminates the first rubber strip R1 again on the part 3A1 of the inner rubber portion 3A and the laminating disc 21, forming a part 3A2 of the inner rubber portion 3A. Thus, the entire inner rubber portion 3A is formed (see FIG. 5D). In this manner, the bead core 2 is placed on the inner rubber portion 3A midway through forming the inner rubber portion 3A, and the part 3A2 of the inner rubber portion 3A on the radially outer side is formed, thus completing the laminating of the inner rubber portion 3A. The first rubber strip R1 is cut by the cutting means (not shown).

Next, the driving device 22 (see FIG. 2) is pivoted to position the laminating disc 21 in front of the second extruder 30B. Then, the laminating disc 21 is rotated, and the second extruder 30B begins to laminate the second rubber strip R2. As described above, the second rubber strip R2 is composed of rubber having a lower rigidity than the inner rubber portion 3A. By laminating the second rubber strip R2, the outer rubber portion 3B (see FIG. 6A), which is positioned on the radially outer side in the stiffener 3, is formed. The second rubber strip R2 is laminated on the inner rubber portion 3A and the laminating disc 21 and after the completion of the lamination, the second rubber strip R2 is cut by the cutting means (not shown).

Next, the cover tape 3C (see FIG. 6B) is attached to the stiffener 3 being formed in one circle, by the attaching device 50. The cover tape 3C is arranged on a part 3D of the stiffener 3 that comes into contact with the end 4A of the carcass ply 4 and covers certain parts of the inner rubber portion 3A and outer rubber portion 3B of the stiffener 3. By going through the above-described process, the fabricating system 10 fabricates the bead member 6 (see FIG. 6C) in which the end 4A of the carcass ply 4 is arranged on the stiffener 3. The bead member 6 is removed from the laminating disc 21 by the robot 12 (see FIG. 2) and is stored in the storage portion 14.

The fabricating system 10 simultaneously laminates the rubber strips R1 and R2 on the respective laminating discs 21 using the first extruder 30A and the second extruder 30B. In other words, the fabricating system 10 fabricates two bead members 6 at a time. The bead members 6 after the fabrication are inspected by an inspection device (not shown). In the inspection process by the inspection device, the cross section of the bead member 6 is measured by a laser-measuring device (not shown), and the final shape of the bead member 6 is inspected on the basis of the measured cross section. More specifically, by comparing the cross section of the bead member 6 with a reference shape, the quality of the bead member 6 is determined. Alternatively, by comparing the cross-sectional dimensions of the bead member 6 with the reference dimensions, the quality of the bead member 6 is determined.

As has been described, because the stiffener 3 having no joined portion is formed by laminating the rubber strips R1 and R2 in this embodiment, the irregularity on the surface of the stiffener 3 can be reduced, and the roundness and the balance in the circumferential direction of the stiffener 3 can be improved. By changing the program of the fabricating system 10, stiffeners 3 of various shapes can be fabricated. Because this eliminates the need of changing hardware, the time and cost can be reduced.

Because the stiffener 3 can be reinforced by the cover tape 3C disposed on the part of the surface of the stiffener 3 that comes into contact with the end 4A of the carcass ply 4, the durability of the stiffener 3 can be improved. Because the durability of the stiffener 3 can be improved by the end 4A of the carcass ply 4, separation due to deformation and strain, which occurs in the stiffener 3 at a position near the end 4A, can be prevented. If the entire stiffener 3, including the cover tape 3C, is formed by laminating the rubber strip R, the production efficiency of the stiffener 3 would be low. In contrast, by arranging the cover tape 3C as a part of the stiffener 3, instead of laminating, the production efficiency of the stiffener 3 can be improved.

Depending on the cross sectional shape of the bead core 2, a gap is produced between the bead core 2 and the laminating disc 21. In particular, when the bead core 2 has a polygonal cross section having five or more sides, the gap between the bead core 2 and the laminating disc 21 is small. It is difficult to laminate the first rubber strip R1 in such a small gap. However, in this embodiment, because the bead core 2 is placed on the part 3A1 of the inner rubber portion 3A after the part 3A1 of the inner rubber portion 3A is formed, the inner rubber portion 3A can be formed in a gap between the bead core 2 and the laminating disc 21. Accordingly, the bead core 2 and the inner rubber portion 3A can be securely and firmly joined.

The radially outer end T1 of the cover tape 3C needs to be positioned radially outer than the end 4A of the carcass ply 4 to reinforce the end 4A of the carcass ply 4. Furthermore, the radially inner end T2 of the cover tape 3C needs to be positioned radially inner than the radially outer end S of the inner rubber portion 3A in the portion in contact with the end 4A of the carcass ply 4.

The cover tape 3C is extruded by the extruder, is placed on the liner 54, and is then arranged on the stiffener 3 at the room temperature. Instead, the cover tape 3C may be disposed on the stiffener 3 at a predetermined temperature higher than the room temperature while being extruded by the extruder. It is preferable that the cover tape 3C have a width of from 38 mm to 50 mm, and a thickness of from 0.7 mm to 1.0 mm. It is preferable that the bead core 2 has a hexagonal cross section.

What is claimed is:

1. A method for fabricating a tire, the method comprising:
a step of forming a stiffener on the outer circumference of a hexagonal bead core having six faces, the stiffener being formed of an inner rubber portion located on the radially inner side and an outer rubber portion located on the radially outer side, an end of a carcass ply being disposed on the stiffener,
wherein the step of forming a stiffener includes a step of forming the inner rubber portion by laminating several layers of a first rubber strip, a step of forming the outer rubber portion on the inner rubber portion by laminating several layers of a second rubber strip having a lower rigidity than that of rubber of the inner rubber portion, and a step of arranging a cover tape with a constant thickness only on a surface of the inner rubber portion and the outer rubber portion opposing the ends of the carcass ply, so that a radially inner end of the cover tape is disposed between a radially inner and a radially outer end of the surface of the inner rubber portion; and
wherein the step of forming the inner rubber portion includes a step of forming a radially inner side by laminating the first rubber strip, a step of placing and attaching the bead core on an inner circumference of the radially inner side so as to substantially completely cover two faces of a radially outer circumference of the hexagonal bead core, and a step of forming a radially outer side by laminating the first rubber strip on a radially outer circumference of the radially inner side after the hexagonal bead core is placed on the radially inner side.

2. The method for fabricating a tire according to claim 1, wherein the cover tape is composed of rubber having a lower rigidity than that of rubber of the inner rubber portion and a higher rigidity than the outer rubber portion.

3. The method for fabricating a tire according to claim 1, wherein a radially outer end of the cover tape is positioned radially outer than the end of the carcass ply.

4. The method for fabricating a tire according to claim 2, wherein a radially outer end of the cover tape is positioned radially outer than the end of the carcass ply.

* * * * *